US011339720B2

(12) United States Patent
Van Ness et al.

(10) Patent No.: US 11,339,720 B2
(45) Date of Patent: May 24, 2022

(54) ACOUSTIC LINER WITH NON-UNIFORM VOLUMETRIC DISTRIBUTION

(71) Applicant: Raytheon Technologies Corporation, Farmington, CT (US)

(72) Inventors: Daniel K. Van Ness, Middletown, CT (US); Anthony R. Bifulco, Ellington, CT (US); David A. Topol, West Hartford, CT (US); David A. Knaul, Glastonbury, CT (US); Michael Raymond LaFavor, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 115 days.

(21) Appl. No.: 16/863,218

(22) Filed: Apr. 30, 2020

(65) Prior Publication Data
US 2021/0277829 A1     Sep. 9, 2021

Related U.S. Application Data

(60) Provisional application No. 62/979,662, filed on Feb. 21, 2020.

(51) Int. Cl.
*F02C 7/24*     (2006.01)
*F04D 29/66*     (2006.01)

(52) U.S. Cl.
CPC .............. *F02C 7/24* (2013.01); *F04D 29/665* (2013.01); *F05D 2220/32* (2013.01); *F05D 2230/60* (2013.01); *F05D 2260/96* (2013.01)

(58) Field of Classification Search
CPC .......... F02C 7/045; F02C 7/24; F04D 29/665; F01D 25/24; B32B 3/12
See application file for complete search history.

(56) References Cited

U.S. PATENT DOCUMENTS 3,734,234 A * 5/1973 Wirt ........................ F02K 1/827
                                             181/286
3,819,009 A * 6/1974 Motsinger ............... F02C 7/045
                                             181/292

(Continued)

FOREIGN PATENT DOCUMENTS

| CA | 2170609 A1 | 1/1996 |
| EP | 3450738 A1 | 3/2019 |
| EP | 3537429 A1 | 9/2019 |

OTHER PUBLICATIONS

European Search Report Issued in European Application No. 21158078.2-1001 dated Jun. 24, 2021; 8 Pages.

*Primary Examiner* — Christopher Verdier
*Assistant Examiner* — Cameron A Corday
(74) *Attorney, Agent, or Firm* — Cantor Colburn LLP

(57) ABSTRACT

Disclosed is an acoustic liner for a gas turbine engine, having: a face sheet; a first plurality of resonator chamber cavities, distributed non-uniformly against the face sheet, the first plurality of resonator chamber cavities defining a first aggregated volume that is configured to target noise attenuation at a first frequency, the first plurality of resonator chamber cavities include first and second resonator chamber cavities fluidly coupled to each other, which have different configurations with respect to each other; and a second plurality of resonator chamber cavities, distributed non-uniformly against the face sheet, the second plurality of resonator chamber cavities define a second aggregated volume that differs from the first aggregated volume and is configured to target noise attenuation at a second frequency, the second plurality of resonator chamber cavities include third and fourth resonator chamber cavities fluidly coupled to each other, which have different configurations with respect to each other.

20 Claims, 6 Drawing Sheets

(56) References Cited

U.S. PATENT DOCUMENTS

| | | | | |
|---|---|---|---|---|
| 3,913,702 | A | * | 10/1975 | Wirt .................... G10K 11/172 |
| | | | | 181/286 |
| 9,620,102 | B1 | * | 4/2017 | Ichihashi ............... B64D 33/02 |
| 10,066,548 | B2 | | 9/2018 | Gilson et al. |
| 10,107,139 | B1 | * | 10/2018 | Jones .................. G10K 11/161 |
| 10,113,559 | B2 | | 10/2018 | Turner et al. |
| 10,460,714 | B1 | | 10/2019 | Koch et al. |
| 10,851,713 | B2 | * | 12/2020 | Roach .................... F02C 7/045 |
| 2015/0041248 | A1 | * | 2/2015 | Ichihashi ................ F02K 1/827 |
| | | | | 181/292 |
| 2015/0367953 | A1 | * | 12/2015 | Yu .......................... F02C 7/045 |
| | | | | 181/222 |
| 2017/0167291 | A1 | | 6/2017 | Koroly |
| 2019/0120143 | A1 | * | 4/2019 | Zhang .................... F01N 1/023 |
| 2019/0270504 | A1 | | 9/2019 | Cedar et al. |
| 2019/0272812 | A1 | | 9/2019 | Lin et al. |
| 2019/0301370 | A1 | | 10/2019 | Joshi et al. |
| 2019/0304428 | A1 | | 10/2019 | Sandiford |
| 2020/0143786 | A1 | * | 5/2020 | Ravise .................... E04B 1/86 |

\* cited by examiner

ACOUSTIC LINER WITH NON-UNIFORM VOLUMETRIC DISTRIBUTION

CROSS-REFERENCE TO RELATED APPLICATIONS

This application claims the benefit of U.S. Provisional Application 62/979,662 filed Feb. 21, 2020, the disclosure of which is incorporated herein by reference in its entirety.

BACKGROUND

Exemplary embodiments of the present disclosure pertain to the art of an acoustic liner for a gas turbine engine and more specifically to an acoustic liner with a non-uniform volumetric distribution.

Aircraft engine fan forward and fan aft noise may be a limiting feature to engine designs as noise regulations become more stringent. Noise is important to control at multiple engine operating conditions, including take-off and descent phases of flight. Single degree of freedom (SDOF) and multi-degree of freedom (MDOF) liners may treat specific tonal and broadband noise spectra within the noise content generated by an aircraft engine, reducing noise by a given level. Such liners may be more effective at attenuating noise at one or more of the engine operating conditions, and may be sub-optimal otherwise due to their geometric design and capability. In view stringent noise regulations, either additional acoustic liners or quieter fan designs may be required, which may be sub-optimal for engine performance, fuel burn efficiency, and/or weight.

BRIEF DESCRIPTION

Disclosed is an acoustic liner for attenuating noise in a gas turbine engine, including an aggregate set of resonator chamber cavities, including a first subset of resonator chamber cavities, inter-disbursed within the aggregate set, the first subset of resonator chamber cavities defining a first aggregated volume that is configured to target noise attenuation at a first frequency, the first plurality of resonator chamber cavities include first and second resonator chamber cavities fluidly coupled to each other, the first and second resonator chamber cavities having different configurations with respect to each other; and a second subset of resonator chamber cavities, inter-disbursed within the aggregate set, the second subset of resonator chamber cavities define a second aggregated volume that differs from the first aggregated volume and that is configured to target noise attenuation at a second frequency, the second subset of resonator chamber cavities include third and fourth resonator chamber cavities fluidly coupled to each other, the third and fourth resonator chamber cavities having different configurations with respect to each other.

In addition to one or more of the above disclosed aspects of the acoustic liner, or as an alternate, the acoustic liner, via the first and second subset of resonator chamber cavities, is configured to target both individual tonal frequencies as well as broadband frequency content over a range of frequencies, wherein the acoustic liner is formed of a pattern of different liner holes comprised of different individual geometries.

In addition to one or more of the above disclosed aspects of the acoustic liner, or as an alternate, the first resonator chamber cavity includes a first cavity shell formed by a first plurality of shell walls, and a first interstitial structure within the first cavity shell; and the second subset chamber cavity includes a second cavity shell formed by a second plurality of shell walls, and a second interstitial structure within the second cavity shell, wherein the first and second interstitial structures have different configurations with respect to each other.

In addition to one or more of the above disclosed aspects of the acoustic liner, or as an alternate, each interstitial structure is defined by one of: a plurality of angled interstitial walls, wherein: the plurality of angled interstitial walls respectively extend from different ones of the respective plurality of shell walls toward a center of the respective cavity shell, wherein: the plurality of angled interstitial walls have different lengths with respect to each other and connect with each other at the center of the respective cavity shell; or the plurality of angled interstitial walls a have same length as each other and are height-wise aligned or offset from each other; or a polygonal surface that is formed by the plurality of angled interstitial walls, the plurality of angled interstitial walls respectively extending from the respective plurality of shell walls toward the center of the respective cavity shell to terminate at a respective plurality of inner edges, wherein the plurality of inner edges define a polygonal center opening having a same shape as the respective cavity shell; an arcuate surface that extends from the respective plurality of shell walls toward the center of the respective cavity shell to terminate at an inner arcuate edge that defines an elliptical center opening; an elongated angled interstitial wall that extends across the respective cavity shell, with or without an elliptical cutout at the center of the respective cavity shell; and one or more lateral walls that extends laterally between different ones of the first plurality of shell walls.

In addition to one or more of the above disclosed aspects of the acoustic liner, or as an alternate, the acoustic liner includes a face sheet, wherein the aggregate set of resonator chamber cavities are distributed against a same side of the face sheet, and wherein at each of the first and second subsets of resonator chamber cavities, the face sheet defines a plurality of through holes.

Further disclosed is a gas turbine engine including: an acoustic liner that includes an aggregate set of resonator chamber cavities, including: a first subset of resonator chamber cavities, inter-disbursed within the aggregate set, the first subset of resonator chamber cavities defining a first aggregated volume that is configured to target noise attenuation at a first frequency, the first subset of resonator chamber cavities include first and second resonator chamber cavities fluidly coupled to each other, the first and second resonator chamber cavities having different configurations with respect to each other; and a second subset of resonator chamber cavities, inter-disbursed within the aggregate set, the second subset of resonator chamber cavities define a second aggregated volume that differs from the first aggregated volume and that is configured to target noise attenuation at a second frequency, the second subset of resonator chamber cavities include third and fourth resonator chamber cavities fluidly coupled to each other, the third and fourth resonator chamber cavities having different configurations with respect to each other.

In addition to one or more of the above disclosed aspects of the gas turbine engine, or as an alternate, the acoustic liner, via the first and second subsets of resonator chamber cavities, is configured to target both individual tonal frequencies as well as broadband frequency content over a range of frequencies, wherein the acoustic liner is formed of a pattern of different liner holes comprised of different individual geometries.

In addition to one or more of the above disclosed aspects of the gas turbine engine, or as an alternate, the second resonator chamber cavity includes a first cavity shell formed by a first plurality of shell walls, and a first interstitial structure within the first cavity shell; and the second resonator chamber cavity includes a second cavity shell formed by a second plurality of shell walls, and a second interstitial structure within the second cavity shell, wherein the first and second interstitial structures have different configurations with respect to each other.

In addition to one or more of the above disclosed aspects of the gas turbine engine, or as an alternate, each interstitial structure is defined by one of: a plurality of angled interstitial walls, wherein: the plurality of angled interstitial walls respectively extend from different ones of the respective plurality of shell walls toward a center of the respective cavity shell, wherein: the plurality of angled interstitial walls have different lengths with respect to each other and connect with each other at the center of the respective cavity shell; or the plurality of angled interstitial walls a have same length as each other and are height-wise aligned or offset from each other; or a polygonal surface that is formed by the plurality of angled interstitial walls, the plurality of angled interstitial walls respectively extending from the respective plurality of shell walls toward the center of the respective cavity shell to terminate at a respective plurality of inner edges, wherein the plurality of inner edges define a polygonal center opening having a same shape as the respective cavity shell; an arcuate surface that extends from the respective plurality of shell walls toward the center of the respective cavity shell to terminate at an inner arcuate edge that defines an elliptical center opening; an elongated angled interstitial wall that extends across the respective cavity shell, with or without an elliptical cutout at the center of the respective cavity shell; and one or more lateral walls that extends laterally between different ones of the first plurality of shell walls.

In addition to one or more of the above disclosed aspects of the gas turbine engine, or as an alternate, the gas turbine engine further includes a face sheet, wherein the aggregate set of resonator chamber cavities are distributed against a same side of the face sheet, and wherein at each of the first and second subsets of resonator chamber cavities, the face sheet defines a plurality of through holes.

In addition to one or more of the above disclosed aspects of the gas turbine engine, or as an alternate, the gas turbine engine further includes a fan section that includes: an outer case that that extends along an engine center axis to define a case forward end and a case aft end; a hub that extends along the engine center axis to define a hub forward end and a hub aft end; and a fan exit guide vane that extends between the hub and the fan outer case, wherein the acoustic liner is installed onto one or more of the fan outer case, the hub and the fan exit guide vane.

In addition to one or more of the above disclosed aspects of the gas turbine engine, or as an alternate, the acoustic liner is installed onto the fan outer case, and is configured as one or more of an ice liner that is forward of the fan exit guide vane, an intrastage liner that is forward of the fan exit guide vane, and a tip passage liner at the fan exit guide vane.

In addition to one or more of the above disclosed aspects of the gas turbine engine, or as an alternate, the acoustic liner is installed onto the hub, and is configured as one or more of a hub passage liner at the fan exit guide vane or an inner aft liner that is aft of the fan exit guide vane.

In addition to one or more of the above disclosed aspects of the gas turbine engine, or as an alternate, the acoustic liner is installed on a pressure and/or suction side of the fan exit guide vane.

In addition to one or more of the above disclosed aspects of the gas turbine engine, or as an alternate, the gas turbine engine further includes a fan, wherein the acoustic liner is installed onto the fan outer case, forward of the fan, and is configured as a forward fan case liner.

Further disclosed is a method of manufacturing an acoustic liner for attenuating noise in a gas turbine engine, including: inter-disbursing, among an aggregate set of resonator chamber cavities, a first subset of resonator chamber cavities, the first subset of resonator chamber cavities being formed to define a first aggregated volume that is configured to target noise attenuation at a first frequency, the first subset of resonator chamber cavities being formed to include first and second resonator chamber cavities fluidly coupled to each other, the first and second resonator chamber cavities are formed to have different configurations with respect to each other; and inter-disbursing, among the aggregate set of resonator chamber cavities, a second subset of resonator chamber cavities, the second subset of resonator chamber cavities being formed to define a second aggregated volume that differs from the first aggregated volume and that is configured to target noise attenuation at a second frequency, the second subset of resonator chamber cavities being formed to include third and fourth resonator chamber cavities fluidly coupled to each other, the third and fourth resonator chamber cavities having different configurations with respect to each other.

In addition to one or more of the above disclosed aspects of the method, or as an alternate, the acoustic liner is configured, via the first and second subsets of resonator chamber cavities, to target both individual tonal frequencies as well as broadband frequency content over a range of frequencies, wherein the acoustic liner is formed of a pattern of different liner holes comprised of different individual geometries.

In addition to one or more of the above disclosed aspects of the method, or as an alternate, inter-disbursing the first subset of resonator chamber cavities among the aggregate set includes: forming the first resonator chamber cavity with a first cavity shell having a first plurality of shell walls and forming a first interstitial structure within the first cavity shell; and forming the second resonator chamber cavity a second cavity shell having a second plurality of shell walls and forming a second interstitial structure within the second cavity shell, wherein the first and second interstitial structures have different configurations with respect to each other.

In addition to one or more of the above disclosed aspects of the method, or as an alternate, forming each interstitial structure includes: forming a plurality of angled interstitial walls, wherein: the plurality of angled interstitial walls respectively extend from different ones of the respective plurality of shell walls toward a center of the respective cavity shell, wherein: the plurality of angled interstitial walls have different lengths with respect to each other and connect with each other at the center of the respective cavity shell; or the plurality of angled interstitial walls a have same length as each other and are height-wise aligned or offset from each other; or a polygonal surface that is formed by the plurality of angled interstitial walls, the plurality of angled interstitial walls respectively extending from the respective plurality of shell walls toward the center of the respective cavity shell to terminate at a respective plurality of inner edges, wherein the plurality of inner edges define a polygonal center opening having a same shape as the respective cavity shell; forming an arcuate surface that extends from the respective plurality of shell walls toward the center of the respective cavity shell to terminate at an inner arcuate edge that defines an elliptical center opening; forming an elongated angled interstitial wall that extends across the respective cavity shell, with or without an elliptical cutout at the center of the respective cavity shell; and forming one or more lateral walls that extends laterally between different ones of the first plurality of shell walls.

In addition to one or more of the above disclosed aspects of the gas turbine engine, or as an alternate, the method includes additively manufacturing the first and second subsets of resonator chamber cavities, including face and back boundaries.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
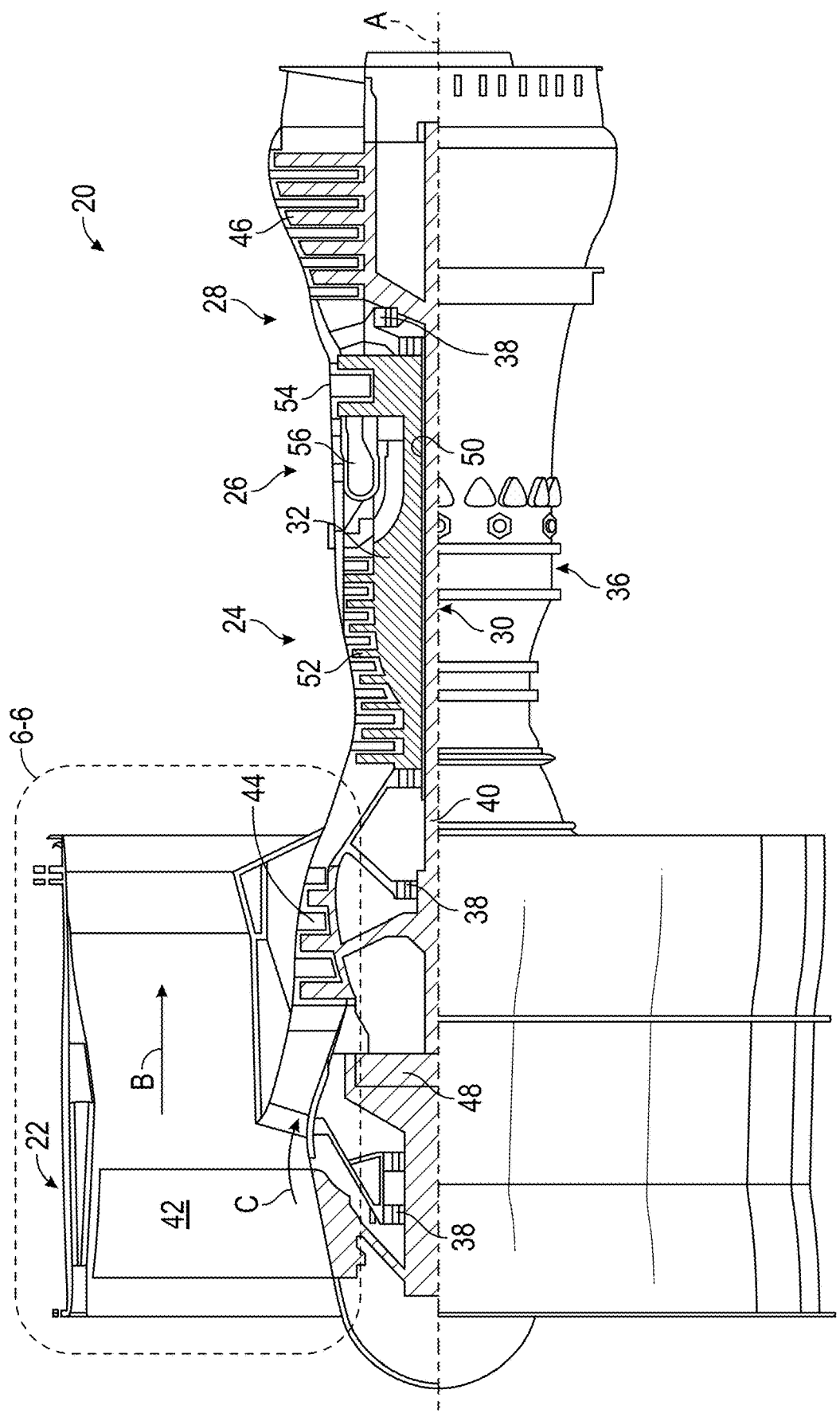
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures and geared fan architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The low and high pressure turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]0.5. The "Low corrected fan tip speed" as disclosed herein according to one non-limiting embodiment is less than about 1150 ft/second (350.5 m/sec).

Known acoustic liners are designed to attenuate a range of frequencies, known as broadband, while targeting a peak frequency or tone. A liner can provide attenuation at multiple frequencies and frequency ranges by being designed with a variety of geometries within the underlying honeycomb. Known liners can be identified, depending upon the design of the honeycomb, as single layer liners, double layer liners, triple layer liners, etc. Each layer can provide attenuation at a targeted peak frequency and range of broadband frequencies. However as indicated, known acoustic liners may be more effective at attenuating noise at one or more of the engine operating conditions, and may be sub-optimal otherwise due to their fixed geometric design and capability. In view of this, the disclosed embodiments provide an acoustic liner that is more capable, than known configurations, in attenuating different noise frequencies that may occur at various stages of flight.

Figure 2:
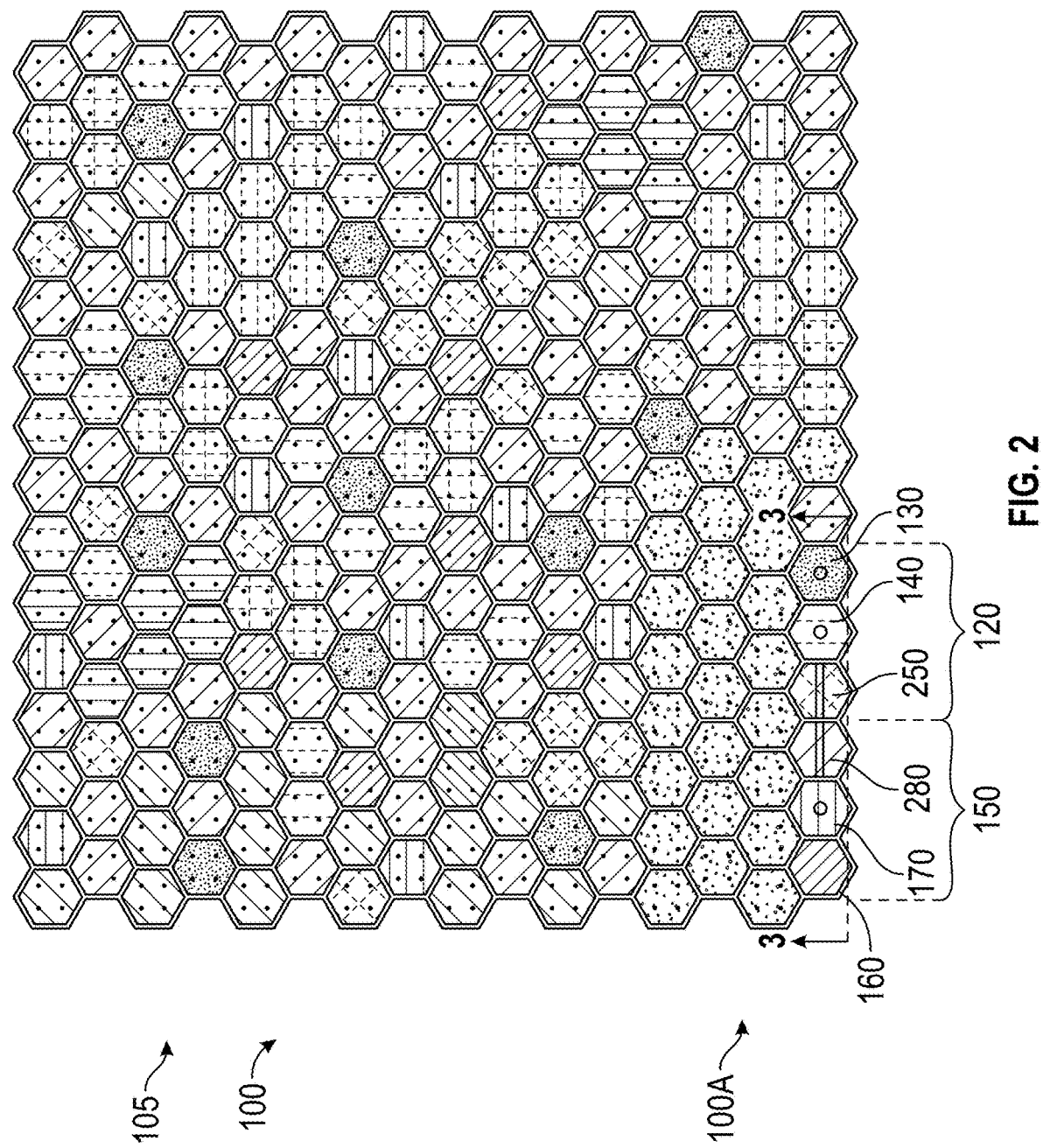
FIG. 2 is a top view of an acoustic liner according to an embodiment.
Figure 3:
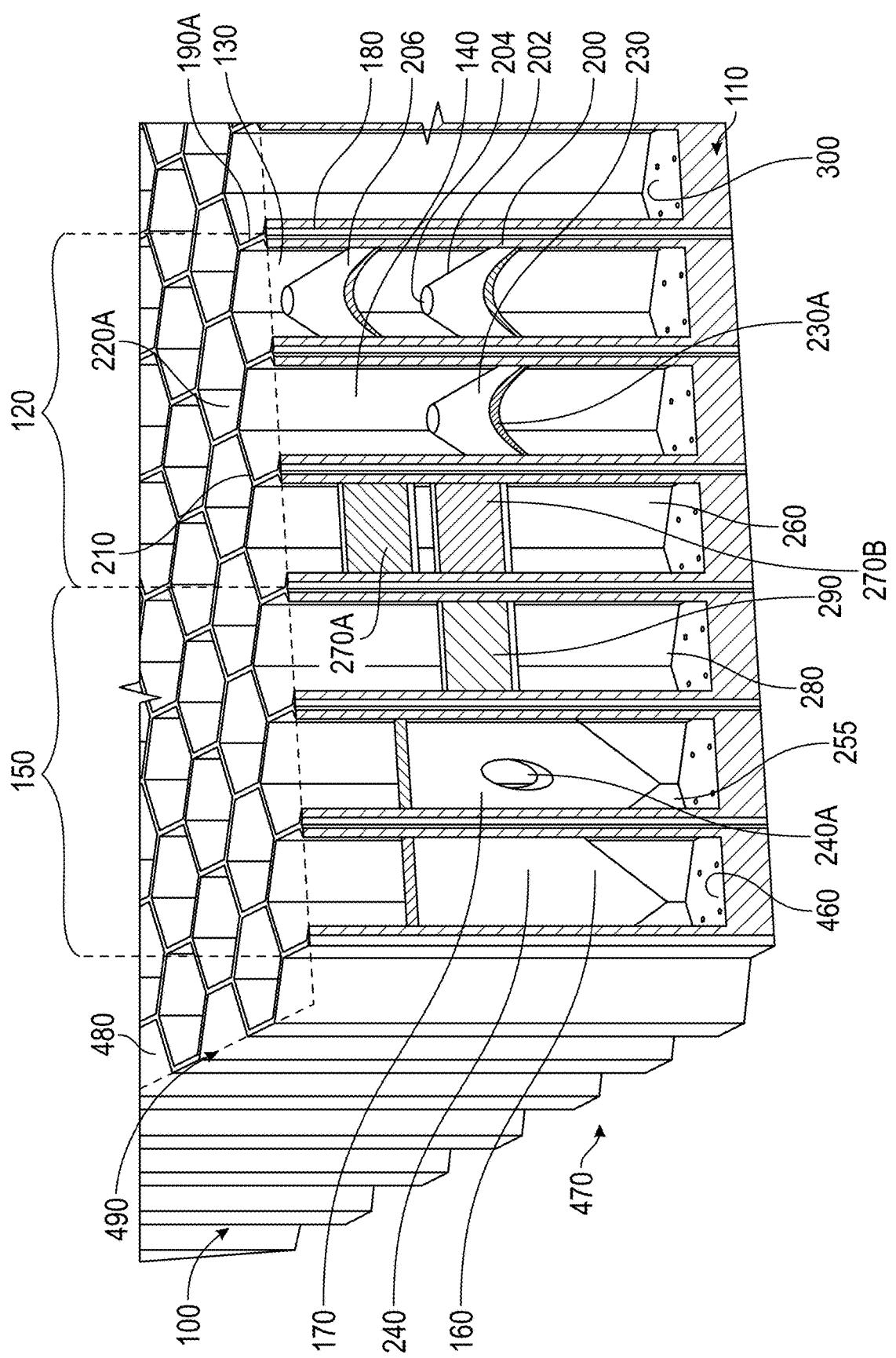
FIG. 3 is a sectional view of the acoustic liner according shown in FIG. 2 along section lines 3-3.

Turning to FIGS. 2-3, disclosed is an acoustic liner 100 for attenuating noise in the gas turbine engine 20. The acoustic liner 100 includes a face sheet 110 (otherwise referred to as a face boundary; shown in FIG. 3). An aggregate set of resonator chamber cavities 105 (e.g. all resonator chamber cavities of the acoustic liner 100) that includes at least a first subset (e.g., plurality) of resonator chamber cavities (or cells) 120 inter-disbursed (e.g., distributed non-uniformly) against a same side (e.g., an inner facing side with respect to the acoustic liner 100) of the face sheet 110. The first subset of resonator chamber cavities 120 defines a first aggregated volume that is configured to target noise attenuation at a first frequency. The first subset of resonator chamber cavities 120 include first and second resonator chamber cavities 130, 140. The first and second resonator chamber cavities 130, 140 have different configurations with respect to each other.

A second subset of resonator chamber cavities 150 of the aggregate set 105 are inter-disbursed (e.g., distributed non-uniformly) against the same side the face sheet 110 as the first subset. It is to be appreciated that by being on the same side of the face sheet 110, the first and second subsets of resonator chamber cavities 120, 150 are physically level or almost level with each other, e.g., height-wise, within the acoustic liner 100. In one embodiment, the first and second subsets of resonator chamber cavities 120, 150 are inter-disbursed among each other within the aggregate set 105.

The second subset of resonator chamber cavities define a second aggregated volume that differs from the first aggregated volume such that it is configured to target noise attenuation at a second frequency. The second subset of resonator chamber cavities 150 include third and fourth resonator chamber cavities 160, 170. The third and fourth resonator chamber cavities 160, 170, have different configurations with respect to each other. It is to be appreciated that a number, orientation (e.g., linear) and placement (e.g., at a front-corner end 100A of the acoustic liner 100) of resonator chamber cavities in each of the first and second subsets of resonator chamber cavities 120, 150 is selected as shown for simplicity. The illustrated embodiment is not intended on limiting a number, orientation or placement of resonator chamber cavities in the acoustic liner 100. The acoustic liner 100, via the first and second subset of resonator chamber cavities 120, 150, is configured to target both individual tonal frequencies as well as broadband frequency content over a range of frequencies. To accomplish this, as shown in the figures and discussed below, the acoustic liner 100 is formed of a pattern of different liner holes comprised of different individual geometries.

As illustrated in FIG. 3, the first resonator chamber cavity 130 a first cavity shell 180 formed by a first plurality of shell walls (or cell walls) 190 (one shell wall 190A is labeled), which are shown in the non-limiting example as a honeycomb or hexagonal shape. A first interstitial structure 200 is formed within the first cavity shell 180 and arranged in a first interstitial structure configuration. The first interstitial structure 200 is formed by a first arcuate surface 202 that extends from the first plurality of shell walls 190 toward a center of the first cavity shell 180 to terminate at an inner arcuate edge 204 that defines an elliptical center opening. The first interstitial structure 200 includes a second arcuate surface 206 that has a same shape as the first arcuate surface 202 and is height-wise spaced from the first arcuate surface 202 in the first cavity shell 180. With this configuration the first interstitial structure 200 defines a dual-conic shape.

The second resonator chamber cavity 140 includes a second cavity shell 210 formed by a second plurality of shell walls 220 (one shell wall 220A is labeled). A second interstitial structure 230 within the second cavity shell 210 is arranged in a second interstitial structure configuration. The second interstitial structure 230 is formed by a third arcuate surface 230A that has a same shape as the first arcuate surface 202. With this configuration the second interstitial structure 230 defines a single-conic shape.

The third resonator chamber cavity 160 includes a third interstitial structure 240 arranged in a third interstitial structure configuration. The third interstitial structure 240 forms a first elongated angled (e.g. slanted) interstitial wall, which extends across the third resonator chamber cavity 160. The fourth resonator chamber cavity 170 includes a fourth interstitial structure 255 that is arranged in a fourth interstitial structure configuration. The fourth interstitial structure 255 is a defined as a second elongated angled interstitial wall 250 that extends across the fourth resonator chamber cavity 160. The second elongated angled interstitial wall 250 defines an elliptical cutout 250A at its center.

A fifth resonator chamber cavity 260 in the first subset of resonator chamber cavities 120 includes a fifth interstitial structure 270 arranged in a fifth interstitial structure configuration. The fifth interstitial structure 270 is defined by a pair of laterally extending walls 270A, 270B that are height-wise spaced from each other. A sixth resonator chamber cavity 280 in the second subset of resonator chamber cavities 150 includes a sixth interstitial structure 290 arranged in a sixth interstitial structure configuration. The sixth interstitial structure 290 is defined by a single laterally extending wall. Another resonator chamber cavity 300 in the acoustic liner 100 is a single degree of freedom cavity, i.e., without an interstitial structure.

Figure 4:
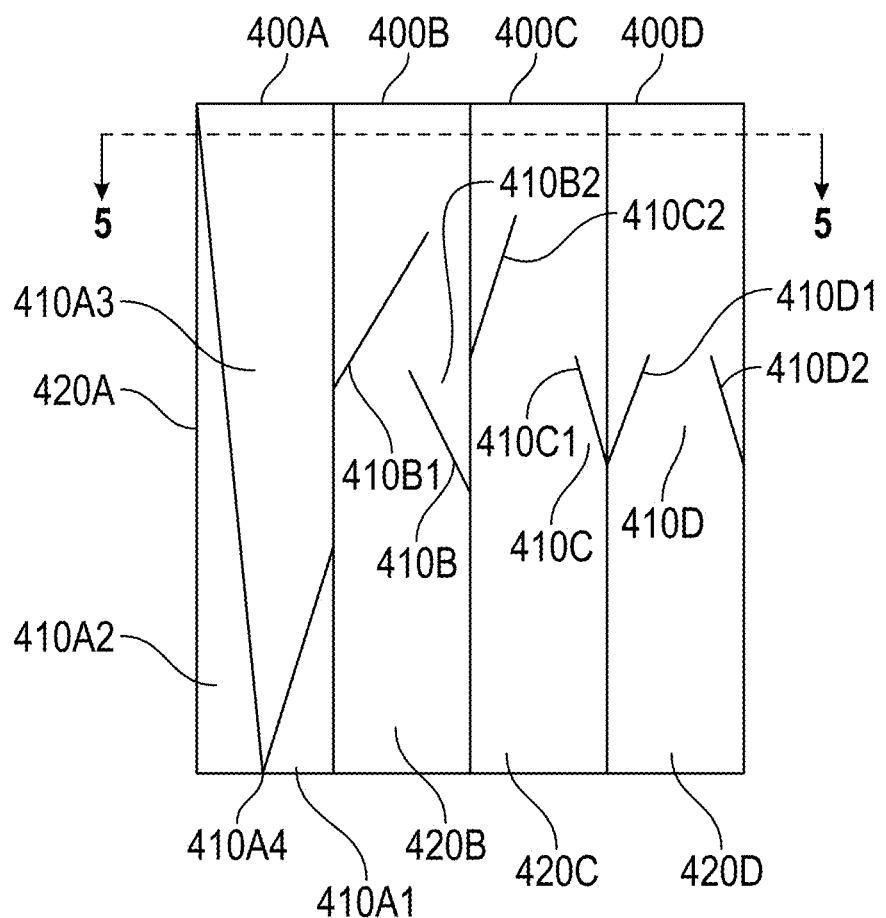
FIG. 4 is a partial cross-sectional view of a set of resonant chamber cavities for an acoustic liner according to an embodiment.
Figure 5:
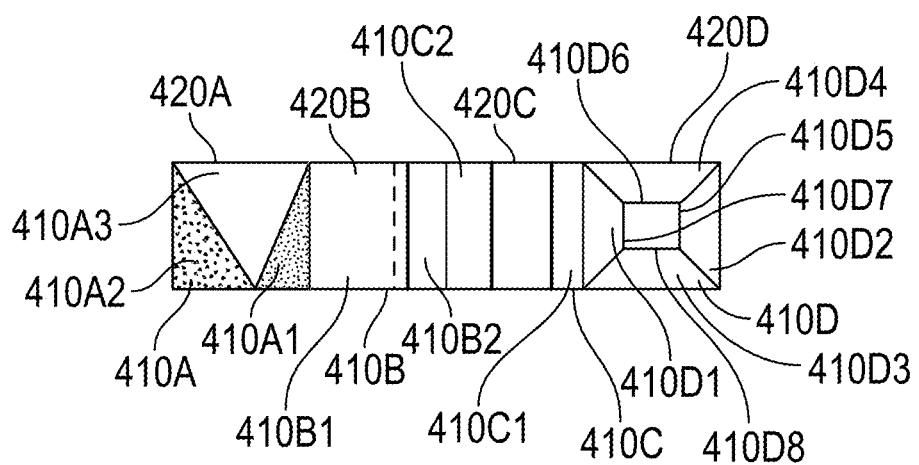
FIG. 5 is a sectional view of the set of resonant chamber cavities shown in FIG. 4 along line 5-5.

Turning to FIGS. 4-5 a set of resonator chamber cavities 400 (labeled as 400A-400D) is shown. Any one of the set of resonator chamber cavities 400 may be utilized in place of any one of the above disclosed resonator cavities in the acoustic liner 100. The set of resonator chamber cavities 400 each have one of four interstitial structures 410 (labeled as 410A-410D) and are formed with one of four cavity shells 420 (labeled as 420A-420D), which are shown in the non-limiting example as having a rectangular or square shape.

In a seventh resonator chamber 400A, the seventh interstitial structure 410A is arranged in a seventh interstitial structure configuration. The seventh interstitial structure 410A is formed by a plurality of angled interstitial walls (three angled interstitial walls 410A1-410A3 are labeled, which are triangular walls) respectively extending from different shell walls of the seventh cavity shell 420A toward the center of the seventh cavity shell 420A. The plurality of angled interstitial walls 410A1-410A3 have different lengths with respect to each other and connect with each other at an apex 410A4 at the center of the seventh cavity shell 420A.

In an eighth resonator chamber 400B, the eighth interstitial structure 410B is arranged in an eighth interstitial structure configuration. The eighth interstitial structure 410B is formed by angled interstitial walls 410B1, 410B2 respectively extending from different shell walls of the eighth cavity shell 420B toward the center of the eighth cavity shell 420B. The lengths are such that the angled interstitial walls 410B1, 410B2 overlap each other at the center of the eighth cavity shell 420B. The angled interstitial walls 410B1, 410B2 are height-wise spaced from one another.

In ninth resonator chamber 400C, the ninth interstitial structure 410C is arranged in a ninth interstitial structure configuration. The ninth interstitial structure 410C is formed by angled interstitial walls 410C1, 410C2 respectively extending from different shell walls of the ninth cavity shell 420C toward the center of the ninth cavity shell 420C. The lengths are such that the angled interstitial walls 410C1, 410C2 are non-overlapping. The angled interstitial walls 410C1, 410C2 may be height-wise spaced or aligned.

In a tenth resonator chamber 400D, the tenth interstitial structure 410D is arranged in a tenth interstitial structure configuration. The tenth interstitial structure is defined by a polygonal surface, which is formed by a plurality of angled interstitial walls 410D1-410D4 that extend from the shell walls toward the center of the tenth cavity shell 420D to terminate at a respective plurality of inner edges 410D5-410D8. The plurality of inner edges 410D5-410D8 define a polygonal center opening having a same shape as the tenth cavity shell 420D (e.g., a rectangular or square shape).

There are limitations to additive manufacturing that may require the shapes shown in the above identified figures (depending on a build direction) in order to "print" without needing additional support structure. The additional support structure equates to additional cost in materials along with the added process of removing the support structure. Though the support structure could be left in, it would add additional weight and thereby be less than optimum (and it may or may not affect the targeted attenuation frequency. For instance, all of the configurations shown in the above identified figures have angles greater than substantially 45° relative to the build direction.

Turning back to FIG. 3, at each of the first and second subsets of resonator chamber cavities 120, 150, the face sheet 110 defines a plurality of through holes (a first set of the through holes 460 is labeled). The face sheet 110 is disposed against a face-sheet-side 470 of the acoustic liner 100. The acoustic liner 100 includes a back sheet 480 (otherwise referred to as a back boundary; illustrated schematically) disposed against a back-sheet-side 490 of the acoustic liner 100.

Figure 6:
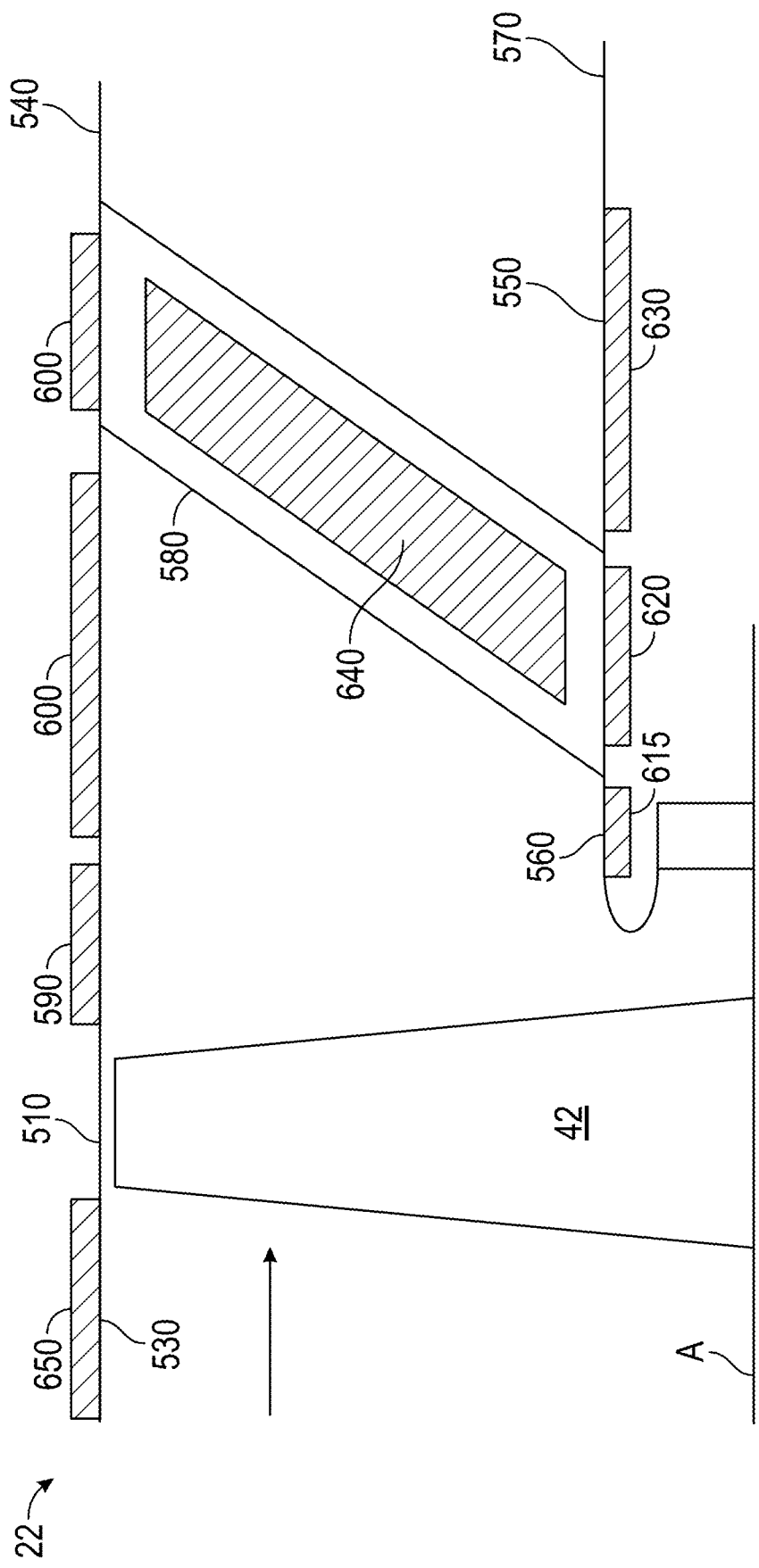
FIG. 6 is a sectional view of the fan section of the gas turbine engine taken illustrated in FIG. 1, within section 6-6.

FIG. 6 is a schematic illustration of section 6-6 from FIG. 1, showing the fan section 22, that includes the fan 42, a fan outer case 510 that that extends along the engine center axis A to define a case forward end 530 and a case aft end 540. A hub 550 extends along the engine center axis A to define a hub forward end 560 and a hub aft end 570. A fan exit guide vane 580 extends between the hub 550 and the fan outer case 520. The fan 42 is operationally connected to the hub 550. As shown, the acoustic liner 100 is installed onto one or more of the fan outer case 520, the hub 550 and the fan exit guide vane 580.

In one embodiment, the acoustic liner 100 is installed onto the fan outer case 510 and is configured as an ice liner 590 that is forward of the fan exit guide vane 580. In one embodiment the acoustic liner 100 is configured as an intrastage liner 600 that is forward of the fan exit guide vane 580. In one embodiment, the acoustic liner 100 is configured as a tip passage liner 610 at the fan exit guide vane 580.

In one embodiment the acoustic liner 100 is installed within the fan section 22 onto the hub 550 and is configured as one or more of a splitter liner 615 that is forward of the fan exit guide vane, a hub passage liner 620 at the fan exit guide vane 580 and an inner aft liner 630 that is aft of the fan exit guide vane 580. In one embodiment the acoustic liner 100 is installed onto a pressure and/or suction side 640 of the fan exit guide vane 580. In one embodiment the acoustic liner 100 is installed within the fan section 22 onto the fan outer case 510, forward of the fan 42, and is configured as a forward fan case liner 650.

Figure 7:
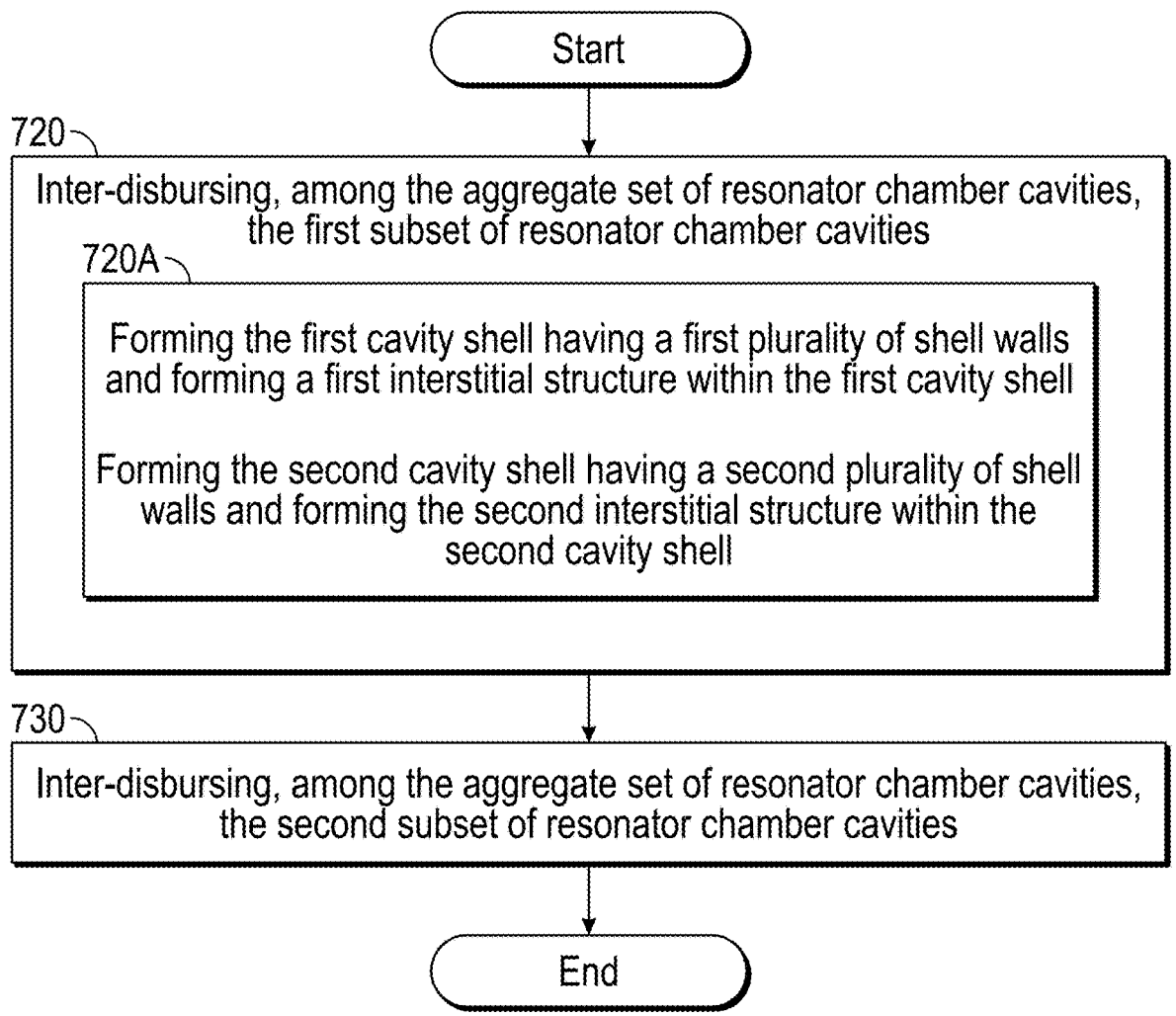
FIG. 7 is a flowchart showing a method of manufacturing an acoustic liner according to an embodiment.

FIG. 7 is a flowchart showing a method of manufacturing the acoustic liner 100 for attenuating noise in the gas turbine engine 20. As shown in block 720, the method includes inter-disbursing, among the aggregate set of resonator chamber cavities 105, the first subset of resonator chamber cavities 120. As indicated, the first subset of resonator chamber cavities 120 are formed to define a first aggregated volume that is configured to target noise attenuation at a first frequency. Additionally, the first subset of resonator chamber cavities 120 are formed to include the first and second resonator chamber cavities 130, 140. Further, the first and second resonator chamber cavities 130, 140 are formed to have different configurations with respect to each other.

As shown in block 730, the method includes inter-disbursing, among the aggregate set of resonator chamber cavities 105, the second subset of resonator chamber cavities 150. As indicated, the second subset of resonator chamber cavities 150 are formed to define the second aggregated volume that differs from the first aggregated volume and that is configured to target noise attenuation at a second frequency. Additionally, the second subset of resonator chamber cavities 150 are formed to include the third and fourth resonator chamber cavities 160, 170. Further, the third and fourth resonator chamber cavities 160, 170, have different configurations with respect to each other.

As shown in block 720A, distributing the first subset of resonator chamber cavities (block 720) further includes forming the first cavity shell 180 having a first plurality of shell walls 190 and forming a first interstitial structure 200 within the first cavity shell 180. This also includes forming the second cavity shell 210 having a second plurality of shell walls 220 and forming the second interstitial structure 230 within the second cavity shell. As indicated, the first and second interstitial structures have different configurations with respect to each other. For example, one of the first and second resonator chamber cavities 130, 140 may be arranged according to one of the ten interstitial configurations identified above and the other of the first and second resonator chamber cavities 130, 140 may be arranged according to another of the ten interstitial configurations identified above.

As indicated, in one embodiment the method includes additively manufacturing the first and second subsets of resonator chamber cavities 120, 150, including face and back boundaries 110, 480, e.g., as a unitary liner.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An acoustic liner for attenuating noise in a gas turbine engine, comprising
   an aggregate set of resonator chamber cavities, including:
   a first subset of resonator chamber cavities, interdisbursed within the aggregate set, the first subset of resonator chamber cavities defining a first aggregated volume that is configured to target noise attenuation at a first frequency, the first subset of resonator chamber cavities include first and second resonator chamber cavities, the first and second resonator chamber cavities having different configurations with respect to each other; and
   a second subset of resonator chamber cavities, interdisbursed within the aggregate set, the second subset of resonator chamber cavities define a second aggregated volume that differs from the first aggregated volume and that is configured to target noise attenuation at a second frequency, the second subset of resonator chamber cavities include third and fourth resonator chamber cavities, the third and fourth resonator chamber cavities having different configurations with respect to each other.

2. The acoustic liner of claim 1, wherein:
   the acoustic liner, via the first and second subsets of resonator chamber cavities, is configured to target both individual tonal frequencies as well as broadband frequency content over a range of frequencies, wherein the acoustic liner is formed of a pattern of different liner holes comprised of different individual geometries.

3. The acoustic liner of claim 1, wherein:
   the first resonator chamber cavity includes a first cavity shell formed by a first plurality of shell walls, and a first interstitial structure within the first cavity shell; and
   the second resonator chamber cavity includes a second cavity shell formed by a second plurality of shell walls, and a second interstitial structure within the second cavity shell,
   wherein the first and second interstitial structures have different configurations with respect to each other.

4. The acoustic liner of claim 3, wherein:
   each interstitial structure is defined by one of:
   a plurality of angled interstitial walls, wherein:
      the plurality of angled interstitial walls respectively extend from different ones of the respective plurality of shell walls toward a center of the respective cavity shell, wherein:
         the plurality of angled interstitial walls have different lengths with respect to each other and connect with each other at the center of the respective cavity shell; or
         the plurality of angled interstitial walls a have same length as each other and are height-wise aligned or offset from each other;
      a polygonal surface that is formed by the plurality of angled interstitial walls, the plurality of angled interstitial walls respectively extending from the respective plurality of shell walls toward the center of the respective cavity shell to terminate at a respective plurality of inner edges, wherein the plurality of inner edges define a polygonal center opening having a same shape as the respective cavity shell;
      an arcuate surface that extends from the respective plurality of shell walls toward the center of the respective cavity shell to terminate at an inner arcuate edge that defines an elliptical center opening;
      an elongated angled interstitial wall that extends across the respective cavity shell, with or without an elliptical cutout at the center of the respective cavity shell; or
      one or more lateral walls that extends laterally between different ones of the first plurality of shell walls.

5. The acoustic liner of claim 1, further comprising:
   a face sheet, wherein the aggregate set of resonator chamber cavities are distributed against a same side of the face sheet, and
   wherein at each of the first and second subsets of resonator chamber cavities, the face sheet defines a plurality of through holes.

6. A gas turbine engine comprising:
   an acoustic liner that includes
      an aggregate set of resonator chamber cavities, including:
      a first subset of resonator chamber cavities, interdisbursed within the aggregate set, the first subset of resonator chamber cavities defining a first aggregated volume that is configured to target noise attenuation at a first frequency, the first subset of resonator chamber cavities include first and second resonator chamber cavities, the first and second resonator chamber cavities having different configurations with respect to each other; and
      a second subset of resonator chamber cavities, interdisbursed within the aggregate set, the second subset of resonator chamber cavities define a second aggregated volume that differs from the first aggregated volume and that is configured to target noise attenuation at a second frequency, the second subset of resonator chamber cavities include third and fourth resonator chamber cavities, the third and fourth resonator chamber cavities having different configurations with respect to each other.

7. The gas turbine engine of claim 6, wherein:
   the acoustic liner, via the first and second subsets of resonator chamber cavities, is configured to target both individual tonal frequencies as well as broadband frequency content over a range of frequencies, wherein the acoustic liner is formed of a pattern of different liner holes comprised of different individual geometries.

8. The gas turbine engine of claim 6, wherein:
the first resonator chamber cavity includes a first cavity shell formed by a first plurality of shell walls, and a first interstitial structure within the first cavity shell; and
the second resonator chamber cavity includes a second cavity shell formed by a second plurality of shell walls, and a second interstitial structure within the second cavity shell,
wherein the first and second interstitial structures have different configurations with respect to each other.

9. The gas turbine engine of claim 8, wherein:
each interstitial structure is defined by one of:
a plurality of angled interstitial walls, wherein:
the plurality of angled interstitial walls respectively extend from different ones of the respective plurality of shell walls toward a center of the respective cavity shell, wherein:
the plurality of angled interstitial walls have different lengths with respect to each other and connect with each other at the center of the respective cavity shell; or
the plurality of angled interstitial walls a have same length as each other and are height-wise aligned or offset from each other;
a polygonal surface that is formed by the plurality of angled interstitial walls, the plurality of angled interstitial walls respectively extending from the respective plurality of shell walls toward the center of the respective cavity shell to terminate at a respective plurality of inner edges, wherein the plurality of inner edges define a polygonal center opening having a same shape as the respective cavity shell;
an arcuate surface that extends from the respective plurality of shell walls toward the center of the respective cavity shell to terminate at an inner arcuate edge that defines an elliptical center opening;
an elongated angled interstitial wall that extends across the respective cavity shell, with or without an elliptical cutout at the center of the respective cavity shell; or
one or more lateral walls that extends laterally between different ones of the first plurality of shell walls.

10. The gas turbine engine of claim 6, further comprising:
a face sheet, wherein the aggregate set of resonator chamber cavities are distributed against a same side of the face sheet, and
wherein at each of the first and second subsets of resonator chamber cavities, the face sheet defines a plurality of through holes.

11. The gas turbine engine of claim 6, further comprising:
a fan section that includes:
an outer case that that extends along an engine center axis to define a case forward end and a case aft end;
a hub that extends along the engine center axis to define a hub forward end and a hub aft end; and
a fan exit guide vane that extends between the hub and the fan outer case,
wherein the acoustic liner is installed onto one or more of the fan outer case, the hub and the fan exit guide vane.

12. The gas turbine engine of claim 11, wherein the acoustic liner is installed onto the fan outer case, and is configured as one or more of an ice liner that is forward of the fan exit guide vane, an intrastage liner that is forward of the fan exit guide vane, and a tip passage liner at the fan exit guide vane.

13. The gas turbine engine of claim 11, wherein the acoustic liner is installed onto the hub, and is configured as one or more of a hub passage liner at the fan exit guide vane or an inner aft liner that is aft of the fan exit guide vane.

14. The gas turbine engine of claim 11, wherein the acoustic liner is installed on a pressure and/or suction side of the fan exit guide vane.

15. The gas turbine engine of claim 11, further including:
a fan,
wherein the acoustic liner is installed onto the fan outer case, forward of the fan, and is configured as a forward fan case liner.

16. A method of manufacturing an acoustic liner for attenuating noise in a gas turbine engine, comprising:
inter-disbursing, among an aggregate set of resonator chamber cavities, a first subset of resonator chamber cavities, the first subset of resonator chamber cavities being formed to define a first aggregated volume that is configured to target noise attenuation at a first frequency, the first subset of resonator chamber cavities being formed to include first and second resonator chamber cavities, the first and second resonator chamber cavities are formed to have different configurations with respect to each other; and
inter-disbursing, among the aggregate set of resonator chamber cavities, a second subset of resonator chamber cavities, the second subset of resonator chamber cavities being formed to define a second aggregated volume that differs from the first aggregated volume and that is configured to target noise attenuation at a second frequency, the second subset of resonator chamber cavities being formed to include third and fourth resonator chamber cavities fluidly coupled to each other, the third and fourth resonator chamber cavities having different configurations with respect to each other.

17. The method of claim 16, wherein:
the acoustic liner is configured, via the first and second subsets of resonator chamber cavities, to target both individual tonal frequencies as well as broadband frequency content over a range of frequencies, wherein the acoustic liner is formed of a pattern of different liner holes comprised of different individual geometries.

18. The method of claim 16, wherein:
inter-disbursing the first subset of resonator chamber cavities among the aggregate set includes:
forming the first resonator chamber cavity with a first cavity shell having a first plurality of shell walls and forming a first interstitial structure within the first cavity shell; and
forming the second resonator chamber cavity a second cavity shell having a second plurality of shell walls and forming a second interstitial structure within the second cavity shell,
wherein the first and second interstitial structures have different configurations with respect to each other.

19. The method of claim 18, wherein:
forming each interstitial structure includes:
forming a plurality of angled interstitial walls, wherein:
the plurality of angled interstitial walls respectively extend from different ones of the respective plurality of shell walls toward a center of the respective cavity shell, wherein:

the plurality of angled interstitial walls have different lengths with respect to each other and connect with each other at the center of the respective cavity shell; or the plurality of angled interstitial walls a have same length as each other and are height-wise aligned or offset from each other;

forming a polygonal surface by the plurality of angled interstitial walls, the plurality of angled interstitial walls respectively extending from the respective plurality of shell walls toward the center of the respective cavity shell to terminate at a respective plurality of inner edges, wherein the plurality of inner edges define a polygonal center opening having a same shape as the respective cavity shell;

forming an arcuate surface that extends from the respective plurality of shell walls toward the center of the respective cavity shell to terminate at an inner arcuate edge that defines an elliptical center opening;

forming an elongated angled interstitial wall that extends across the respective cavity shell, with or without an elliptical cutout at the center of the respective cavity shell; or forming one or more lateral walls that extends laterally between different ones of the first plurality of shell walls.

20. The method of claim 16, comprising additively manufacturing the first and second subsets of resonator chamber cavities, including face and back boundaries.

\* \* \* \* \*